April 1, 1969 J. F. INGLE 3,436,496

SYSTEM INCLUDING A REVERSIBLE AMPLIFIER FOR TESTING ELECTRICAL TRANSMISSION MEDIA

Filed March 29, 1966 Sheet 1 of 5

INVENTOR
J. F. INGLE
BY [signature]
ATTORNEY

April 1, 1969 J. F. INGLE 3,436,496

SYSTEM INCLUDING A REVERSIBLE AMPLIFIER FOR TESTING ELECTRICAL TRANSMISSION MEDIA

Filed March 29, 1966 Sheet 3 of 5

FIG. 4

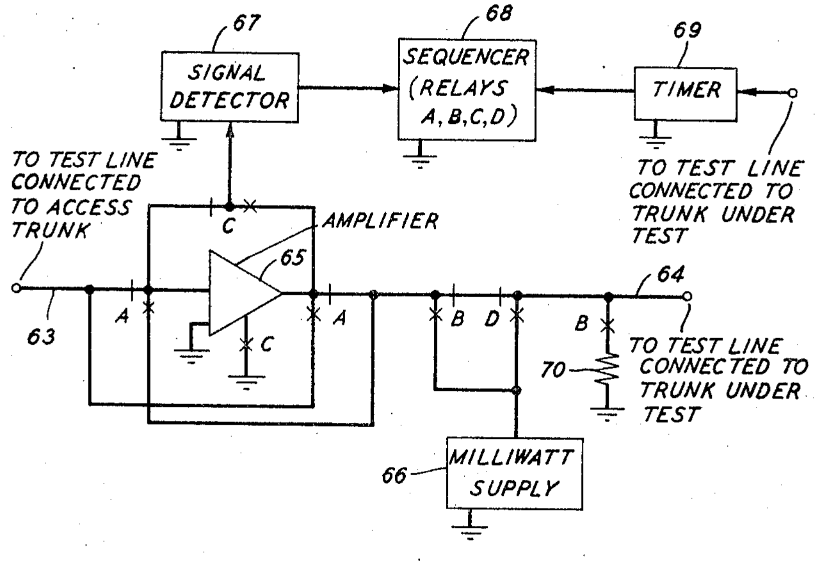

FIG. 4A

| SEQUENCER ADVANCED BY OUTPUT FROM | RELAYS OPERATED | | | | FUNCTION BEING PERFORMED DURING THE TIME RELAYS ARE OPERATED AND RELEASED AS SHOWN |
|---|---|---|---|---|---|
| | A | B | C | D | |
| DETECTOR | | | | | |
| TIMER | X | X | | | 3 SEC. MWT FROM FIG. 4 TO NEAR END |
| TIMER | | | | | 2/6 FREQ. SIGNAL FROM NEAR TO FAR END |
| DETECTOR | X | | | | MWT FROM FAR END TO NEAR END |
| DETECTOR | | | | X | MWT FROM FIG. 4 TO FAR END |
| DETECTOR | X | | | | LOSS DATA FROM FAR TO NEAR END |
| DETECTOR | X | | X | | NEAR END MEASURING NOISE |
| DETECTOR | | | | | 2/6 FREQ. SIGNAL FROM NEAR TO FAR END |
| DETECTOR | X | | | | FAR END MEASURES NOISE |
| DETECTOR | X | | | | NOISE DATA FROM NEAR TO FAR END |
| DETECTOR | | | | | 2/6 FREQ. SIGNAL FROM NEAR TO FAR END |

United States Patent Office 3,436,496

Patented Apr. 1, 1969

3,436,496
SYSTEM INCLUDING A REVERSIBLE AMPLIFIER FOR TESTING ELECTRICAL TRANSMISSION MEDIA

James F. Ingle, New Providence, N.J., assignor to Bell Telephone Laboratories, Incorporated, New York, N.Y., a corporation of New York Filed Mar. 29, 1966, Ser. No. 538,349
Int. Cl. H04b 3/46; H03f 21/00
U.S. Cl. 179—175.3 4 Claims This invention relates to performing two-way transmission tests on communication paths.

The addition of direct distance dialing to a telephone system requires faster and more sensitive interstation or interoffice trunk testing. Test apparatus meeting this need is disclosed in G. E. McLaughlin patent application Ser. No. 538,350, filed on even date herewith. In its basic form, the McLaughlin apparatus makes measurements through the use of amplitude-to-pulse width converters in near-end and far-end equipments. The far-end produced pulses are transmitted to the near-end equipment so that all measurements are available at the near end of the system.

A feature of the McLaughlin invention is that a trunk remote from an existing near-end equipment may be tested without having to provide a relatively expensive near-end equipment at either end of the trunk. In accordance with this feature, a far-end equipment is provided at each end of the remote trunk. These far-end equipments are controlled by the existing near-end equipment to perform desired tests and to transmit the resulting measurements to the near-end equipment.

An object of the present invention is to produce further monetary saving in a remote trunk testing arrangement of the above-described type by replacing one of the far-end equipments with less expensive equipment.

This and other objects are achieved by replacing the far-end equipment intermediate the near-end equipment and the other far-end equipment in the McLaughlin arrangement with equipment that features a test tone source and a reversible amplifier that provides either unity gain or a gain greater than unity. This new equipment is responsive to waves from the near-end and far-end equipments to perform a number of functions. It first transmits a test tone to the near-end equipment so that the transmission loss between the new equipment and the near-end equipment is measured and stored for later use. The new equipment then passes a test tone from the far-end equipment to the near-end equipment where the far-end to near-end transmission loss is measured. The difference between these two measurements, which is the far-end to new equipment loss, is produced by the near-end equipment. The new equipment next transmits a test tone to the far-end equipment where the new equipment to far-end loss is measured. This measurement is transmitted through the new equipment to the near-end equipment. All loss measurements are thereby available at the near-end equipment.

For noise measurements, the new equipment first provides a substantial gain in the far-to-near direction. The noise produced in the far-end to new equipment path is therefore readily recognized and measured by the near-end equipment because it is greater in amplitude than noise produced in the new equipment to near-end path. As a refinement the previously measured transmission loss between the new equipment and the near-end equipment is added to this last produced measurement to correct for the loss experienced by the amplified noise after leaving the new equipment. The new equipment next provides a termination while the far-end equipment measures the noise in the path from the new equipment to the far-end equipment. This measurement is then transmitted through the new equipment to the near-end equipment so that all measurements are available at one location.

The use of the reversible one-way amplifier, in accordance with the invention, provides a number of advantages not possible when using a two-way amplifier. First, waves from undesired directions are in effect ignored. This prevents noise in the access trunk from being measured when measuring noise from the new equipment office to the far-end office and, furthermore, it reduces the possibility of false signaling because waves from only one direction are possible at any one time. Second, good terminations are provided when desired by controlling the direction in which the amplifier is directed. Third, the problem of loop gain within two-way amplifiers (which varies with the impedance of the trunks) does not exist. Fourth, the reversible one-way amplifier is cheaper than a two-way amplifier. Finally, with the exclusion of the above-mentioned increase in gain provided for one of the noise measurements, the gain in either direction through the office is the same. The present invention therefore permits less expensive equipment to be used to perform the above-mentioned tests more accurately than possible with a two-way amplifier.

Other objects and features of the invention will become apparent from a study of the following detailed description of an embodiment.

In the drawings:

FIG. 4 is a block diagram of test equipment in accordance with the invention;

FIG. 4A is a table setting forth the sequence of operation of relays in FIG. 4.

DESCRIPTION OF FIG. 1.

Figure 1:
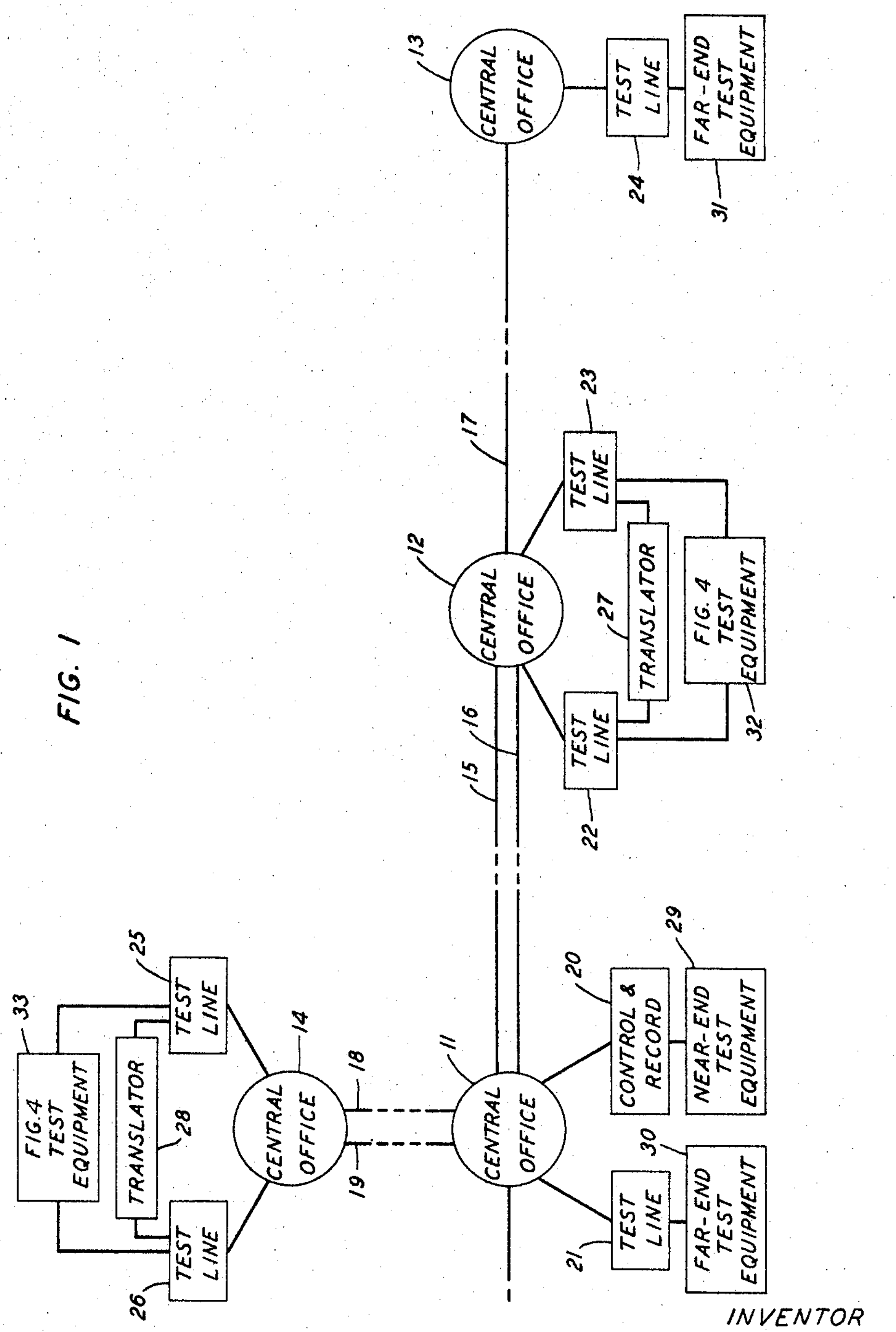
FIG. 1 is a block diagram of a portion of a telephone system using the invention.

FIG. 1 shows a telephone network and associated apparatus for testing trunks within the network. The network includes four central offices 11–14 interconnected by trunks 15–19. The remaining equipment, which includes the invention, forms the test apparatus. This apparatus performs loss and noise measurements of all the trunks and collects, checks and records the measurements at office 11.

The test apparatus includes a control and record equipment 20 connected to central office 11. Equipment 20 contains a stored program that directs specific trunks and far-end equipments to be seized for testing purposes and then starts the testing procedure. It also records the results of the tests.

The test apparatus also includes test lines 21–26. Each test line is seized by dialing a number assigned to it. Once seized it furnishes acknowledging supervisory signals to trunk and office switching equipment. It also furnishes trunk parameter information (such as two- or four-wire) to test equipment connected to it.

Connected between test lines 22 and 23 and test lines 25 and 26 are translators 27 and 28. These translators respond to signals received through test lines 22 and 25 and transmit signals through test lines 23 and 26 that result in the seizure of a particular trunk and test line at the other end of the trunk.

A near-end test equipment 29 is connected to control and record equipment 20 and far-end test equipments 30 and 31 are connected to test lines 21 and 24. These equipments may take the form of those disclosed in the above-mentioned copending patent application.

Test equipments 32 and 33 are connected between test lines 22 and 23 and test lines 25 and 26, respectively. These equipments are disclosed in detail in FIG. 4. Once the appropriate equipments and trunks have been interconnected, test equipments 32 and 33 cooperate with near-end test equipment 29 and far-end test equipments 30 and 31 to perform loss and noise measurements on the trunks. Since these measurements cannot be performed until all equipments and trunks have been interconnected, a detailed description of FIG. 4 and the actual measuring process is delayed until after the following brief description of the general operation of FIG. 1.

*General operation of FIG. 1*

When the stored program in control and record equipment 20 indicates that trunk 15 is to be tested, the control and record equipment directs office 11 to seize trunk 16 and then dials test line 22. Upon connection of test line 22 to trunk 16, test line 22 transmits supervisory signals to control and record equipment 20 to indicate readiness. Translator 27 then recognizes a signal from control and record equipment 20 (via test line 22) and transmits a signal that causes test line 23 to be connected to trunk 15 by central office 12 and, furthermore, causes test line 21 to be connected to the other end of trunk 15 by office 11. When test line 21 is connected to trunk 15, a supervisory signal is transmitted through trunk 15, through the equipments at office 12 and through trunk 16 to control and record equipment 20. Testing instructions from the stored program are then applied to near-end test equipment 29. After the tests are performed, measurements are accumulated and checked at near-end test equipment 29 with the results recorded in control and record equipment 20.

Trunk 16 is tested in the same manner.

Although trunk 17 is not directly connected to office 11, the invention permits the trunk to be measured. In particular, when the stored program indicates that trunk 17 is to be tested, trunk 15 or 16 and test line 22 are seized. Upon connection of test line 22 to one of the trunks 15, 16, a supervisory signal is sent back to control and record equipment 20 to indicate readiness. Control and record equipment 20 then transmits a signal to translator 27 which recognizes the signal and transmits another signal via test line 23 that causes trunk 17 and test line 24 to be seized. When this occurs, test line 24 transmits a supervisory signal back to control and record equipment 20. Control and record equipment 20 then instructs near-end test equipment 29, to perform specific tests. Near-end test equipment 29, test equipment 32 and far-end test equipment 31 then cooperate to perform the indicated tests. The measurements produced are collected and checked in near-end test equipment 29 with the results stored in control and record equipment 20.

Trunk 19 is different from the other trunks as it is seizable only by office 14. Testing of this trunk is accomplished by seizing trunk 18 and test line 25 through office 11 in response to an output from control and record equipment 20. When supervisory signals from test line 25 are received by control and record equipment 20, signals are sent to translator 28 whereupon translator 28 transmits signals via test line 26 to cause office 14 to seize trunk 19 and test line 21. Upon the seizure of test line 21, supervisory signals are sent back through trunk 19, equipment at office 14 and trunk 18 to record and control equipment 20. Control and record equipment 20 then signals near-end test equipment 29 to begin testing. Near-end test equipment 29, test equipment 33 and far-end test equipment 30 then cooperate to test trunk 19. Measurements produced as a result of this test are collected and checked in near-end test equipment 29 with the results recorded in control and record equipment 20. (It should be noted that the testing of trunk 19 is identical to the testing of trunks 15 and 16.)

DESCRIPTION OF FIG. 2

Figure 2:
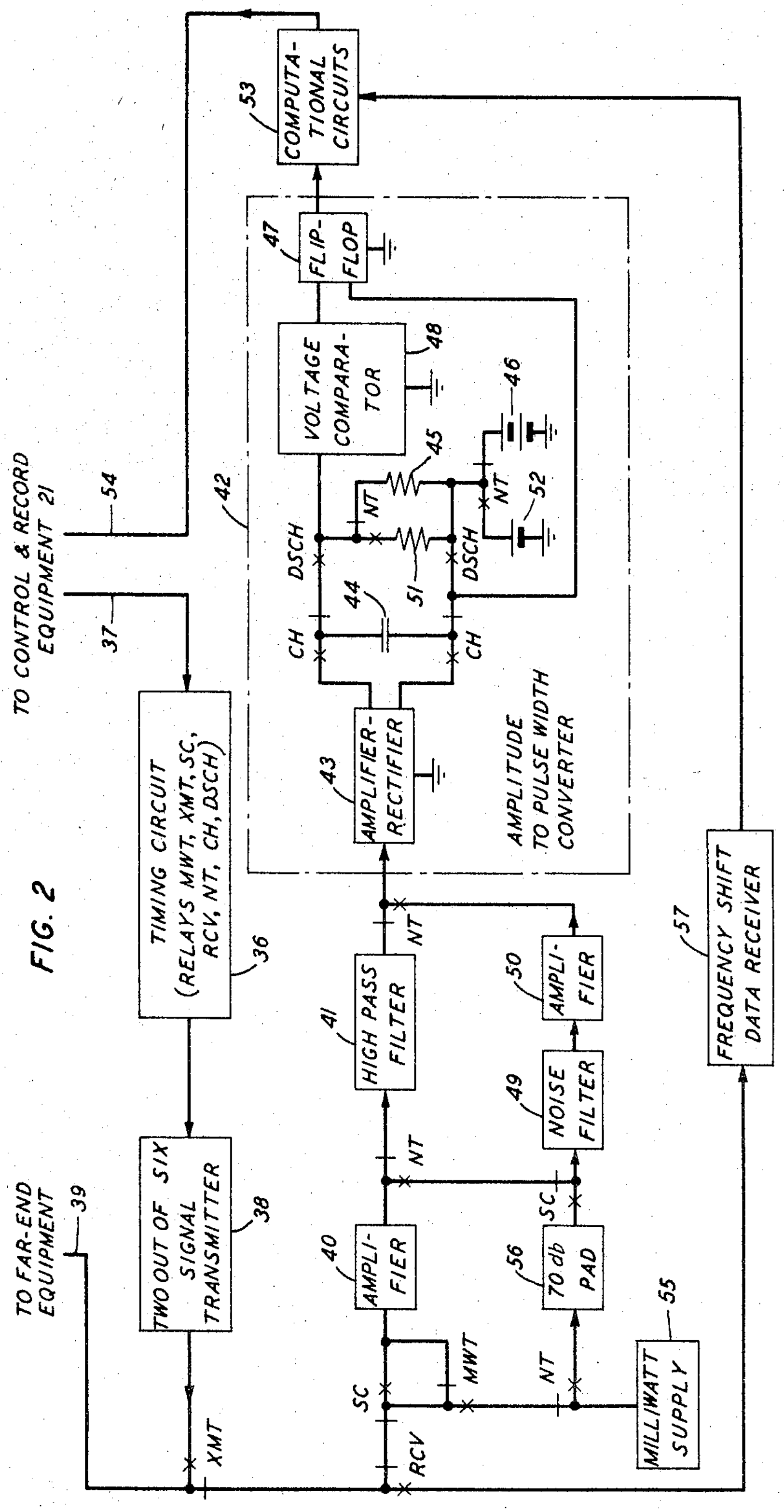
FIG. 2 is a block diagram of a near-end test equipment for use in FIG. 1.

The near-end equipment disclosed in FIG. 2 forms a part of the aforementioned McLaughlin system. It includes a timing circuit 36 which is triggered by start signals on lead 37 from record and control equipment 21 of FIG. 1. Included in timing circuit 36 are a plurality of relays MWT, XMT, SC, RCV, NT, CH and DSCH. The contacts for these relays are shown in detached form on various leads of FIG. 2. Circuit 36 controls the operation of the relays in a sequence which is later discussed in detail with the use of FIGS. 5 and 6. Circuit 36 also applies signals to a conventional two-out-of-six frequency signal transmitter 38. When transmitter 38 is producing an output, relay XMT is operated so that the transmitter output passes over a lead 39 toward a far-end equipment.

For loss measuremens, test signals received over lead 39 pass through an amplifier 40 and a high-pass filter 41. The output of filter 41 is applied to an amplitude-to-pulse width converter 42. The converter comprises an amplifier-rectifier 43 that applies its output across a capacitor 44 when the relay CH is operated. When relay CH released and relay DSCH is operated, a discharge path in the form of a resistor 45 is connected across capacitor 44. At the same time the lower end of the resistor-capacitor combination is biased by a voltage source 46 and a flip-flop 47 is set. When the voltage level at the upper terminal of capacitor 44 decreases to a predetermined level, a voltage comparator 48 is triggered and the comparator produces an output that resets flip-flop 47. The duration of the output of flip-flop 47 is therefore logarithmically related to the amplitude of the input to amplifier-rectifier 43; that is, the durations of the pulses represent in decibels the amplitudes of the amplifier-rectifier input.

For noise measurements, relay NT is operated. The output of amplifier 40 now passes through a noise filter 49 and an amplifier 50 to converter 42. Amplifier 50 increases the sensitivity of the equipment. At the same time a resistor 51 is connected in parallel with capacitor 44 to decrease the time constant. This decrease in time constant causes the decibel scale factor of the amplifier-rectifier circuit output to be compressed by a factor of ten. This is considered desirable because noise measurements generally need not be made with the same degree of accuracy as loss measurements. A bias source 52 is connected at this time to the lower extremity of the parallel combination. This increases the decibel range over which the noise can be measured.

The output of converter 42 is applied to computational circuits 53 where its duration and deviation from a predetermined duration are determined. This may be accomplished in a number of different ways. A preferred way uses an oscillator that produces an output for the duration of the output of converter 42. A counter then counts the oscillations as a measurement of duration while a preset counter counts down from a preset value to measure the deviation from a predetermined duration. The output of computational circuits 53 is applied by a lead 54 to control and record equipment 21 of FIG. 1.

FIG. 2 also includes a milliwatt supply 55. The output of this supply is sent out over lead 39 when relay MWT is operated.

A loss measurement self-check of the near-end equipment is performed when relays MWT and SC are operated. Under these conditions, the output of supply 55 passes through amplifier 40 and high-pass filter 41 to converter 42. Computational circuits 53 measure the output of converter 42 as previously described and send the measurements back to control and record circuit 20 of FIG. 1.

A noise self-check measurement is performed when relays NT and SC are operated. The output of supply 55 now passes through a 70 db attenuation pad 56, noise filter 49 and amplifier 50 to converter 42. Computational circuits 53 again measure the output of converter 42 as previously described and send the measurements back to control and record circuit 20 of FIG. 1.

The near-end equipment also includes a conventional frequency shift data receiver 57. When relay RCV is operated, frequency shift data on lead 39 is applied to the receiver. The output of the receiver, which is in a pulse-width form, is applied to computational circuits 53 where it is handled in the same manner as the output from converter 42.

DESCRIPTION OF FIG. 3

Figure 3:
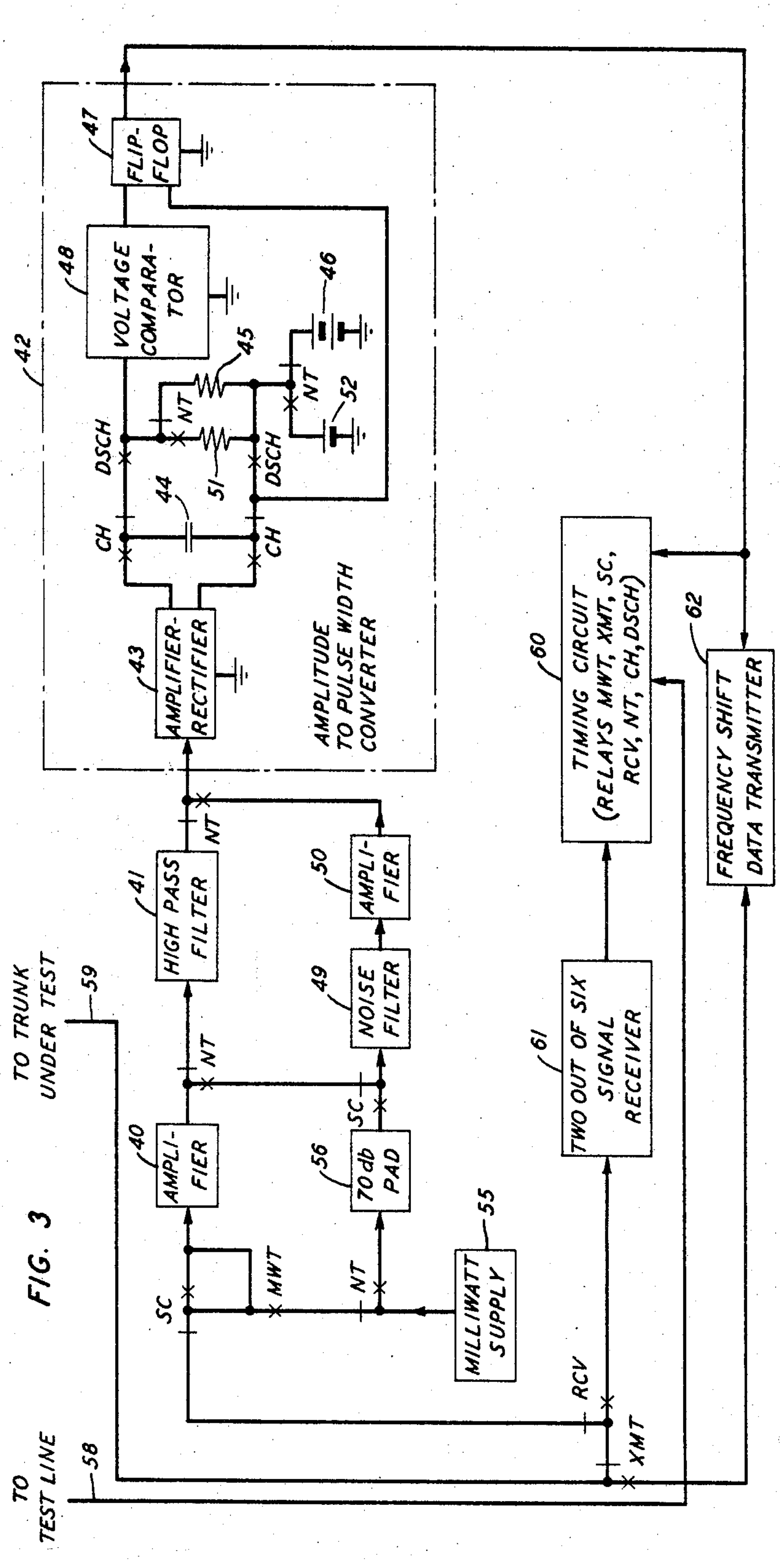
FIG. 3 is a block diagram of a far-end test equipment for use in FIG. 1.

FIG. 3 discloses a single-ended far-end test equipment that may be used for test equipments 32, 33 and 35 of FIG. 1. This equipment, which forms a part of the aforementioned McLaughlin system, includes an amplifier 40, a filter 41, a converter 42, a pad 56, a filter 49, an amplifier 50, a supply 55 and various interconnections identical in structure and operation to those in the near-end equipment of FIG. 2. The same symbols have been used to identify these elements.

FIG. 3 has a pair of leads 58 and 59 that are connected to its test line and the trunk under test, respectively. Lead 58 is connected to a timing circuit 60 which includes relays MWT, XMT, SC, RCV, NT, CH and DSCH. The test line places a signal on lead 58 when the equipment has been connected to the trunk under test. This signal operates the RCV relay which, in turn, connects a two-out-of-six frequency signal receiver 61 to lead 59. A two-out-of-six frequency signal received over the trunk under test causes receiver 61 to trigger timing circuit 60. The timing circuit then sequentially operates its relays in a manner which is discussed later in detail.

The output of converter 42 is applied to a conventional frequency shift data transmitter 62 whose output, in turn, is transmitted over lead 59 when relay XMT is operated. Loss, noise and self-check measurements are thus transmitted back over the trunk under test in frequency shift data form.

DESCRIPTION OF FIG. 4

The equipment disclosed in FIG. 4 includes a lead 63 that connects to an access trunk test line. It also includes a lead 64 that connects to the trunk-under-test test line. The equipment further includes an amplifier 65, a milliwatt supply 66, a signal detector 67, a sequencer 68, a timer 69 and a terminating resistor 70.

Sequencer 68 includes a plurality of relays A, B, C and D that are operated in the sequence shown in FIG. 4A.

Timer 69 responds to a test line output produced when both end equipments are ready for performing tests. The timer output causes relays A and B of sequencer 68 to operate and remain operated for three seconds.

Detector 67 produces an output in response to the beginning and cessation of each input applied to it. These outputs cause the operation and release of relays A, B, C and D as shown in FIG 4A only after timer 69 has completed its cycle.

Amplifier 65 normally provides a zero db gain. When relay C is operated, a resistor is added to a feedback path in amplifier 65 and the amplifier provides a 20 db gain.

Figure 5:
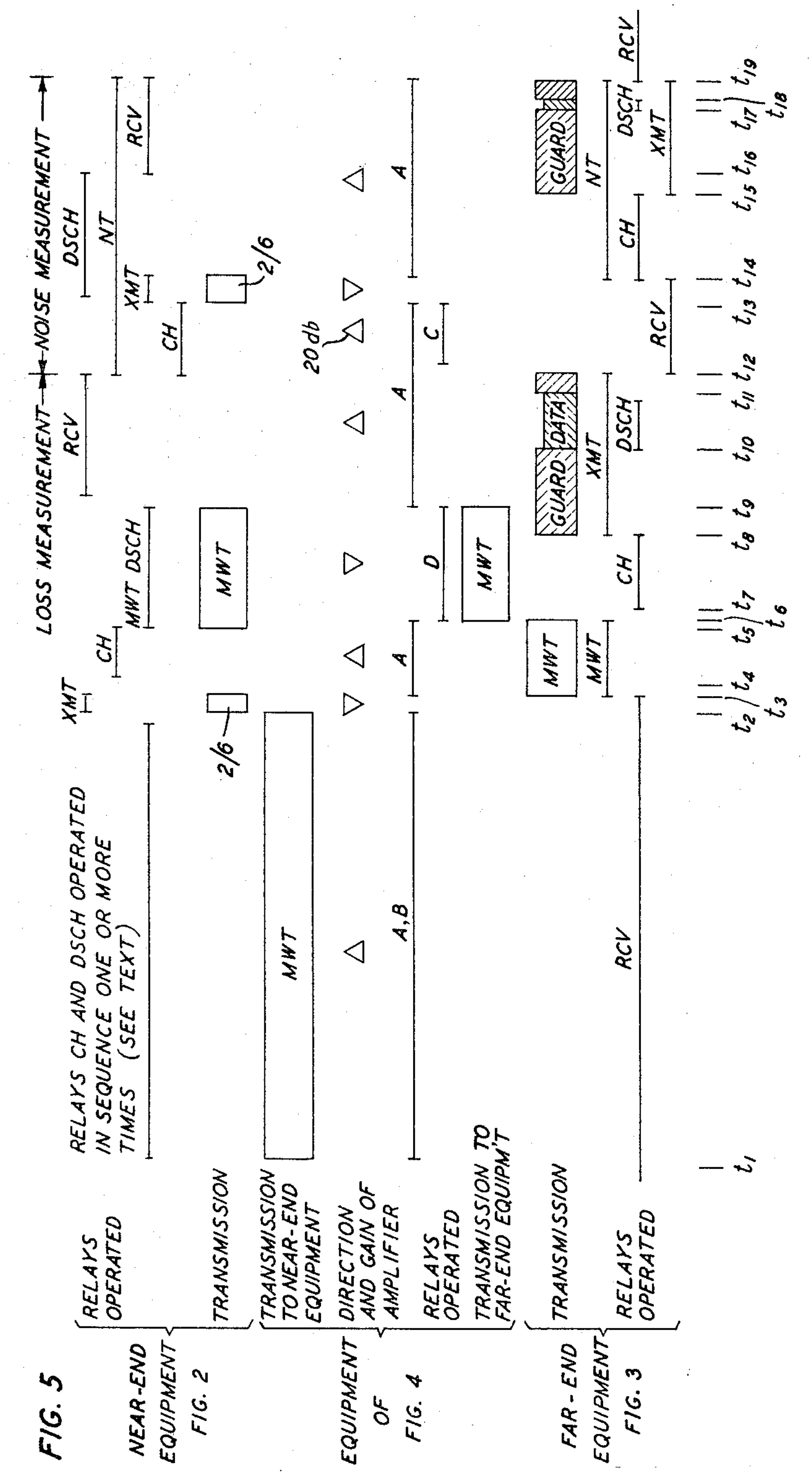
FIG. 5 is a timing diagram for use in explaining the operation of the disclosed embodiment.

The sequence in which relays A, B, C and D operate and the functions performed as a result of their operation is shown in FIG 4A and is discussed in detail with respect to FIG. 5. Briefly, relay A operates to reverse amplifier 65; relay B operates to connect the milliwatt supply to transmit toward the near-end equipment, and furthermore, to connect terminating resistor 70 to the trunk under test; relay C operates to increase the gain of amplifier 65 and, furthermore, to modify the sequence of source inputs for detector 67; and relay D operates to connect the milliwatt supply to transmit toward the far-end equipment.

OPERATION OF THE DISCLOSED EMBODIMENT FOR PERFORMING LOSS AND NOISE MEASUREMENTS OF A TRUNK

FIG. 5A shows the timing sequence of both the relay operations and functions to produce loss and noise measurements of a trunk. At the time $t_1$ the equipments shown in FIGS. 2, 3 and 4 have been connected to an access trunk and a trunk under test as shown, for example, in FIG. 1. Relay RCV in FIG. 3 is operated when this equipment is connected to the trunk. The operations required to make these connections have been discussed previously in detail.

At the time $t_1$ timer 69 receives an input from the test line connected to the trunk under test indicating that the tests are to begin. Timer 69 then produces a three second output which causes relays A and B of sequencer 68 to operate and remain operated for the three seconds. With the operation of these two relays a milliwatt test tone is applied by the way of amplifier 65 and lead 63 to the access trunk. (The triangles in FIG. 5 indicate the directions in which amplifier 65 is pointing.) At time $t_2$ the output from timer 69 terminates and relays A and B are released. During the interval $t_1$–$t_2$, relay CH and DSCH in FIG. 2 operate in sequence one or more times to record the transmission loss of the access trunk from equipment of FIG. 4 to the equipment of FIG. 2. This loss information is later used for both loss and noise measurements.

In the interval $t_2$–$t_3$, amplifier 65 in FIG. 4 is pointed in a near-to-far direction. Furthermore relay RCV, which was operated at time $t_1$, remains operated. The control and recond equipment 20 in FIG. 1 senses the end of the three-second milliwatt test tone and produces an output on lead 37 in FIG. 2 which causes timing circuit 36 to begin its timing cycle. As a result of this action, relay XMT operates for the interval $t_2$–$t_3$ and a two-out-of-six frequency signal is transmitted toward FIG. 4. As amplifier 65 is pointing in a near-to-far direction, the two-out-of-six signal is passed to FIG. 3 where it is applied to receiver 61. The output of receiver 61 triggers timing circuit 60, which starts the timing cycle of FIG. 3. All equipments are now operating.

Upon the termination of the above-mentioned two-out-of-six signal, detector 67 in FIG. 4 operates sequencer 68, which, in turn, operates relay A. Amplifier 65 is now pointed in a far-to-near direction. Relay MWT in FIG. 3 is operated for the interval $t_3$–$t_6$. In the interval $t_4$–$t_5$ relay CH of FIG. 2 is held operated. The amplitude of the test tone received by FIG. 2 is thereby sampled. It should be noted that the milliwatt test tone transmitted by FIG. 3 terminates after the release of relay CH in FIG. 2 in order to assure sampling of the test tone.

Relays MWT and DSCH in FIG. 2 operate for the interval $t_5$–$t_8$. The operation of relay DSCH discharges the test tone sample to produce a pulse width modulated output that is applied to computational circuits 53 in FIG. 2. The new-equipment to near-end loss measurement made during the interval $t_1$–$t_2$ is then subtracted from this latest loss measurement. The output of computational circuit 53 is, in turn, applied to control and record equipment 20. The operation of relay MWT, on the other hand, causes a milliwatt test tone to be transmitted toward the far end.

When the milliwatt test tone transmission from FIG. 3 terminates at time $t_7$, detector 67 in FIG. 4 detects the cessation of this test tone and advances sequencer 68 which causes the release of relay A and the operation of relay D. The release of relay A results in amplifier 65 being pointed in a near-to-far direction while the operation of relay D disconnects amplifier 65 from lead 64 while connecting milliwatt supply 66 to lead 64. The milliwatt test tone from FIG. 2 is therefore blocked by FIG. 4 and a new test tone at a milliwatt level is transmitted over the trunk under test to the far-end equipment. The loss of the access trunk does not therefore affect the accuracy of this measurement.

Relay CH in FIG. 3 is operated for the interval $t_7$–$t_8$ to sample the amplitude of the received test tone. At time $t_8$ relay XMT in FIG. 3 is operated to connect frequency shift data transmitter 62 to the trunk under test. A guard tone is transmitted in the interval $t_8$–$t_{10}$. This guard tone conditions any echo suppressors in the transmission paths for the subsequent transmission of data information.

The cessation of the transmission of the test tone by FIG. 2 at the time $t_9$ is detected by detector 67 of FIG. 4 which, in turn, advances sequencer 68. Sequencer 68 then releases relay D and operates relay A so that amplifier 65 is now pointing in a far-to-near direction.

At the time the milliwatt test tone from FIG. 2 ceases, relay RCV of FIG. 2 is operated. Relay DSCH in FIG. 3 operates at time $t_{10}$ and capacitor 44 begins to discharge. The output of flip-flop circuit 47 changes at time $t_{11}$ and relay DSCH release in response to this change. During the interval $t_{10}$–$t_{11}$, a data pulse is transmitted by transmitter 62. This data pulse is passed by amplifier 65 to FIG. 2. Upon reception by FIG. 2, the data pulse is detected by receiver 57 and applied in its reconverted form to computational circuits 53. The output of computational circuits 53 is applied to control and record equipment 20. At time $t_{12}$ relay RCV in FIG. 2 and relay XMT in FIG. 3 release. This completes the loss measurement cycle.

The cessation of the guard tone from FIG. 3 at the time $t_{12}$ is detected by detector 57 in FIG. 4. The detector then advances sequencer 68 which causes relay C to operate. The operation of relay C increases the gain of amplifier 65 and, furthermore, transfers the input of detector 67 from the input of amplifier 65 to the amplifier's output. (Detector 67 does not respond to the noise because its threshold level is above the amplified noise level.) At this time, therefore, amplifier 65 is pointed in a far-to-near direction and, furthermore, provides a gain of 20 db. Relay RCV in FIG. 3 also operates at time $t_{12}$ and provides a termination of the farthest end of the trunk under test. In addition, relays NT and CH in FIG. 2 operate. The noise appearing on the trunk under test is amplified 20 db by amplifier 65 and sampled in FIG. 2. By amplifying the noise in the trunk under test, this noise is distinguishable over the noise occurring in the access trunk.

In FIG. 2 relay CH releases and relays DSCH and XMT operate at time $t_{13}$. The operation of relay DSCH causes capacitor 44 in FIG. 2 to discharge. The pulse width modulated output thus produced represents the amplified noise on the trunk under test minus the transmission loss in the access trunk plus the noise occurring in the access trunk. Because of the gain provided by amplifier 65, the noise appearing in the access trunk is only a minor contribution to the measured output. The transmission loss of the access trunk generally is sufficiently high to warrant correction of the noise measurement. This is done by using the transmission loss information obtained in the interval $t_1$–$t_2$.

The operation at time $t_{13}$ of relay XMT in FIG. 2 causes a two-out-of-six frequency signal to be transmitted. Sequencer 68 in FIG. 4 at this time responds to the output of detector 67 produced by the beginning of the two-out-of six frequency signal. Relays A and C are released by sequencer 68. Amplifier 65 now provides unity gain and is pointed in a near-to-far direction so that the remainder of the two-out-of-six frequency signal is transmitted to FIG. 3.

It should be noted that the above referred to two-outsix signal is longer than the one between times $t_2$–$t_3$. This extra length is to compensate for the time lost prior to the release of relays A and C.

The two-out-of-six frequency signal is recognized by receiver 61 in FIG. 3 and timing circuit 60 is again triggered. Timing circuit 60 then releases relay RCV and operates relay NT and CH. At the same time, relay XMT in FIG. 2 releases and the two-out-of-six frequency signal transmitted by FIG. 2 ceases. The output produced by detector 67 in FIG. 4 as a result of the cessation of the two-out-of-six frequency, sequencer 68 advances to operate relay A. Amplifier 65 is now pointed in a far-to-near direction and acts as a termination for that end of the trunk under test.

In the interval $t_{14}$–$t_{15}$, capacitor 44 of FIG. 3 samples the amplitude of the noise occurring in the trunk under test. At time $t_{15}$ relay CH in FIG. 3 is released while relay XMT is operated. FIG. 3 then transmits a guard tone which places any echo suppressors in the trunks in condition for subsequent transmission of a data tone. At time $t_{16}$ relay DSCH in FIG. 2 is released and relay RCV is operated. Between times $t_{17}$ and $t_{18}$, relay DSCH in FIG. 3 is operated to discharge capacitor 44. This results in the transmission of a data pulse through amplifier 65 of FIG. 4 to data receiver 57 of FIG. 2.

At time $t_{19}$ relays XMT and NT in FIG. 3 release and relay RCV operates. At the same time, relays RCV and NT in FIG. 2 release. The cessation of the guard tone from FIG. 3 causes sequencer 68 to advance and release relay A. This terminates the noise measurement and places all of the relays in the condition in which they were prior to time $t_1$.

The above-discussed sequence diagrams are, of course, not drawn to scale and, furthermore, some of the operating and release times of the relays do not necessarily have to occur at the precise times shown in the diagrams. For example, some of the operations of the DSCH relays can be shortened without adversely affecting the operation of the circuits. Furthermore, some of the relays may be of the slow release type to insure the operation of other relays. These technicalities are well within the scope of those skilled in the art.

Although the invention has been disclosed with respect to a particular embodiment, various other embodiments may be devised by those skilled in the art without departing from the spirit and scope of the invention. Furthermore, use of the invention is not limited to the system disclosed in the above-identified McLaughlin application. The invention may, for example, be advantageously used with the measuring system disclosed in B. McKim et al. U.S. Patent 2,721,235, issued on Oct. 18, 1955.

What is claimed is:

1. In combination with a communication path measuring system comprising near-end equipment and far-end equipment, test equipment connected by a first communication path to said near-end equipment and a second communication path to said far-end equipment, said test equipment comprising
an amplifier,
a source of test tones, and
means responsive to waves from said near-end and far-end equipments to connect said amplifier to selectively provide unity gain from said source of test tones to said first path, unity gain from said first path to said second path, unity gain from said second path to said first path and gain greater than unity from said second path to said first path,
said means further responsive to waves to selectively connect said source of test tones to said second path.

2. A measuring system responsive to control equipment to measure a two-way communication path between first and second stations, where said control equipment may be at said second station, said system comprising
means at said first station to transmit a test one to said control equipment and second station on a selective basis, unidirectional transmission means at said first station to selectively provide either unity gain or a fixed gain greater than unity and, furthermore, either transmission from said control equipment to said second station or from said second station to said control equipment, means at said first station responsive to waves from said control equipment and second station to control each of said first station means, means at said control equipment and second station to transmit test tones toward said first station, means at said control equipment and second station to produce pulses having durations related to the amplitudes of received waves, means at said second station to transmit said second station pulses toward said first station, means at said control equipment to transmit control signals toward said first station, and means at said control equipment responsive to said control equipment and second station produced pulses to produce indications relating to the durations of these pulses.

3. A system controllable over a first path from a control point to measure a second path between first and second stations where said control point may be at said second station, said system comprising a source of test tones at each of said stations and said control point, converter means at said control point and said second station to produce pulses having durations related to the amplitudes of received waves, transmitting means at said second station to transmit the output of said second station pulse producing means, receiving means at said control point to receive said second station pulse producing means output, transmitting means at said control point to transmit control signals, receiving means at said first and second stations to respond to received waves to produce control outputs, an amplifier at said first station, timing means at said control point to selectively connect to said first path at said control point the output of said test tone source, the input of said converter means, the input of said receiving means and the output of said transmitting means, timing means at said second station to selectively connect to said second path at said second station the output of said test tone source, the input of said converter means, the output of said transmitting means and the input of said timing means, and means at said first station responsive to waves from said control point and said second station to connect said amplifier to selectively provide unity gain from said first station test tone source to said first path, from said first path to said second path and from said second path to said first path, and gain greater than unity from said second path to said first path, said last-mentioned means further responsive to waves to connect said second station test tone source to said second path.

4. In combination a first pair of terminals and a second pair of terminals, an amplifier, a source of test tones, and means responsive to waves received at said terminals to connect said amplifier to provide, on a selective basis, unity gain from said source to a first pair of said terminals, unity gain from said first pair of terminals to the second pair of terminals, unity gain from said second pair of terminals to said first pair of terminals and gain greater than unity from said second pair of terminals to said first pair of terminals, said means further responsive to waves at a pair of said terminals to selectively connect said source to said second pair of terminals.

No references cited.

KATHLEEN H. CLAFFY, *Primary Examiner.*

ARTHUR A. McGILL, *Assistant Examiner.*

U.S. Cl. X.R.

330—1